US008665905B1

(12) United States Patent
Barnes et al.

(10) Patent No.: US 8,665,905 B1
(45) Date of Patent: Mar. 4, 2014

(54) SYSTEMS AND METHODS FOR CENTRALLY PROVISIONING VIRTUAL CIRCUIT INFORMATION (75) Inventors: Daniel Josiah Barnes, Harvest, AL (US); James Alexander Mabry, Madison, AL (US); Dennis Clinton Cox, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 298 days.

(21) Appl. No.: 12/900,250

(22) Filed: Oct. 7, 2010

(51) Int. Cl.
*H04J 3/16* (2006.01)
*H04J 3/22* (2006.01)

(52) U.S. Cl.
USPC ............ 370/469; 370/466; 370/254; 370/255

(58) Field of Classification Search
USPC .............. 370/230.1, 232, 252, 254, 386, 397, 370/399, 395.3, 419, 420; 709/235, 238, 709/239
See application file for complete search history.

(56) References Cited

U.S. PATENT DOCUMENTS

| | | | |
|---|---|---|---|
| 7,023,879 B1 * | 4/2006 | Sitaraman et al. ............ 370/466 |
| 7,069,328 B1 * | 6/2006 | Bell .............................. 709/227 |
| 7,139,276 B1 * | 11/2006 | Sitaraman et al. ............ 370/401 |
| 7,295,566 B1 * | 11/2007 | Chiu et al. ..................... 370/419 |
| 7,519,064 B1 * | 4/2009 | Agrawal et al. ............ 370/395.1 |
| 7,570,663 B2 * | 8/2009 | Jungck .......................... 370/498 |
| 7,676,605 B1 * | 3/2010 | Citterelle et al. ................. 710/5 |
| 7,751,329 B2 * | 7/2010 | Lapuh et al. .................. 370/235 |
| 7,808,979 B2 * | 10/2010 | Parker et al. .................. 370/353 |
| 7,839,800 B2 * | 11/2010 | Finn et al. ..................... 370/254 |
| 7,843,962 B2 * | 11/2010 | Gunthorpe et al. ........... 370/466 |
| 7,894,450 B2 * | 2/2011 | Unbehagen et al. ........ 370/395.3 |
| 7,908,335 B1 * | 3/2011 | Citterelle et al. ............. 709/212 |
| 8,005,926 B2 * | 8/2011 | Harkin et al. ................. 709/218 |
| 8,032,633 B2 * | 10/2011 | Felton et al. .................. 709/225 |
| 8,094,661 B2 * | 1/2012 | Salinger et al. ............... 370/392 |
| 8,185,663 B2 * | 5/2012 | Cochran et al. ............... 709/250 |
| 8,250,212 B2 * | 8/2012 | Felton et al. .................. 709/226 |
| 8,386,433 B1 * | 2/2013 | Kadayam ...................... 707/656 |
| 2005/0060409 A1 * | 3/2005 | Dube et al. .................... 709/226 |
| 2006/0120361 A1 | 6/2006 | Sharma et al. |
| 2008/0049776 A1 | 2/2008 | Wiley et al. |
| 2008/0049777 A1 | 2/2008 | Morrill et al. |
| 2009/0116493 A1 * | 5/2009 | Zhu et al. .................... 370/395.3 |

* cited by examiner

*Primary Examiner* — Brian O'Connor
(74) *Attorney, Agent, or Firm* — Maynard, Cooper & Gale, P.C.; Jon E. Holland (57) ABSTRACT

A system for provisioning virtual circuit information in packet has a plurality of access modules that are inserted into slots of a chassis at a network facility. Each access module is provisioned with sets of Ethernet virtual circuit (EVC) attribute data in order to provide the access module with sufficient information to handle data packets carried by EVCs serviced by the access module. Rather than manually provisioning each access module with EVC attribute data, the sets of attribute data are stored at a central location. Each access module has logic that is configured to automatically retrieve, from the central location, sets of attribute data associated with the EVCs to be serviced by the access module. The logic then automatically provisions the access module to handle data packets carried by such EVCs.

25 Claims, 7 Drawing Sheets

SYSTEMS AND METHODS FOR CENTRALLY PROVISIONING VIRTUAL CIRCUIT INFORMATION

RELATED ART

Due to their relatively low cost and good performance, Ethernet networks are increasingly being used to carry data across portions of a telephony system. In such an environment, packets are often carried by a virtual circuit compatible with Ethernet protocols, referred to as an Ethernet Virtual Circuit or EVC. Each EVC is associated with a particular data service and carries data packets for such service through an Ethernet network. In this regard, each data packet associated with the same data service is assigned a particular identifier, referred to as an "S-tag," that identifies the EVC that is to carry the service's packets. Each node of the Ethernet network is provisioned to switch data packets based on their S-tags so that packets with the same S-tag generally follow predefined paths within the network thereby establishing a virtual circuit through the network.

Unfortunately, the process of appropriately provisioning the various nodes of an Ethernet network such that they appropriately switch data packets and implement the desired EVCs is burdensome and time consuming. Techniques for facilitating the provisioning of nodes of a telephony system, including an Ethernet network in particular, are generally desired.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for provisioning virtual circuit (VC) information in packet networks. For illustrative purposes, several embodiments for provisioning EVC information will be described hereafter. However, it should be emphasized that the same or similar techniques and configurations may be used to provision virtual circuits of protocols other than Ethernet.

In one exemplary embodiment, a plurality of access modules are inserted into slots of a chassis at a network facility, such as a central office. The access modules are configured to service EVCs by receiving data packets carried by the EVCs and processing the data packets such that they are forwarded to their respective destinations based on overhead information, such as S-tags, included in the data packets. Thus, each access module is provisioned with sets of EVC attribute data in order to provide the access module with sufficient information to handle the packets to be received by such module. Rather than manually provisioning each access module with EVC attribute data, the sets of attribute data are stored at a central location such as in one of the slots of the chassis or at a location remote from the chassis and access modules inserted therein. Each access module has logic that is configured to automatically retrieve, from the central location, sets of attribute data associated with the EVCs to be serviced by the access module. The logic then automatically provisions the access module to handle data packets carried by such EVCs. Accordingly, the process of provisioning the access modules is facilitated.

A system in accordance with an exemplary embodiment of the present disclosure comprises a plurality of access modules communicating with a switch module. EVC use data indicating the status of each access module is stored in the switch module. Also, EVC attributes for each possible EVC that may use the network are provisioned into the switch module for use by the access modules. Each access module is provisioned with an EVC map for mapping packet identifiers to virtual local area network (VLAN) tags, such as S-tags. For each EVC identified by a VLAN tag or other EVC identifier in the EVC map, the access module requests a copy of the EVC's attributes (an "EVC shadow") from the switch module. If the switch module accepts the request, the switch module transmits the EVC shadow to the access module. Based on the EVC shadow and the EVC map, the access module appropriately handles packets carried by the EVC so that the packets can be forwarded to their respective destinations.

Figure 1:
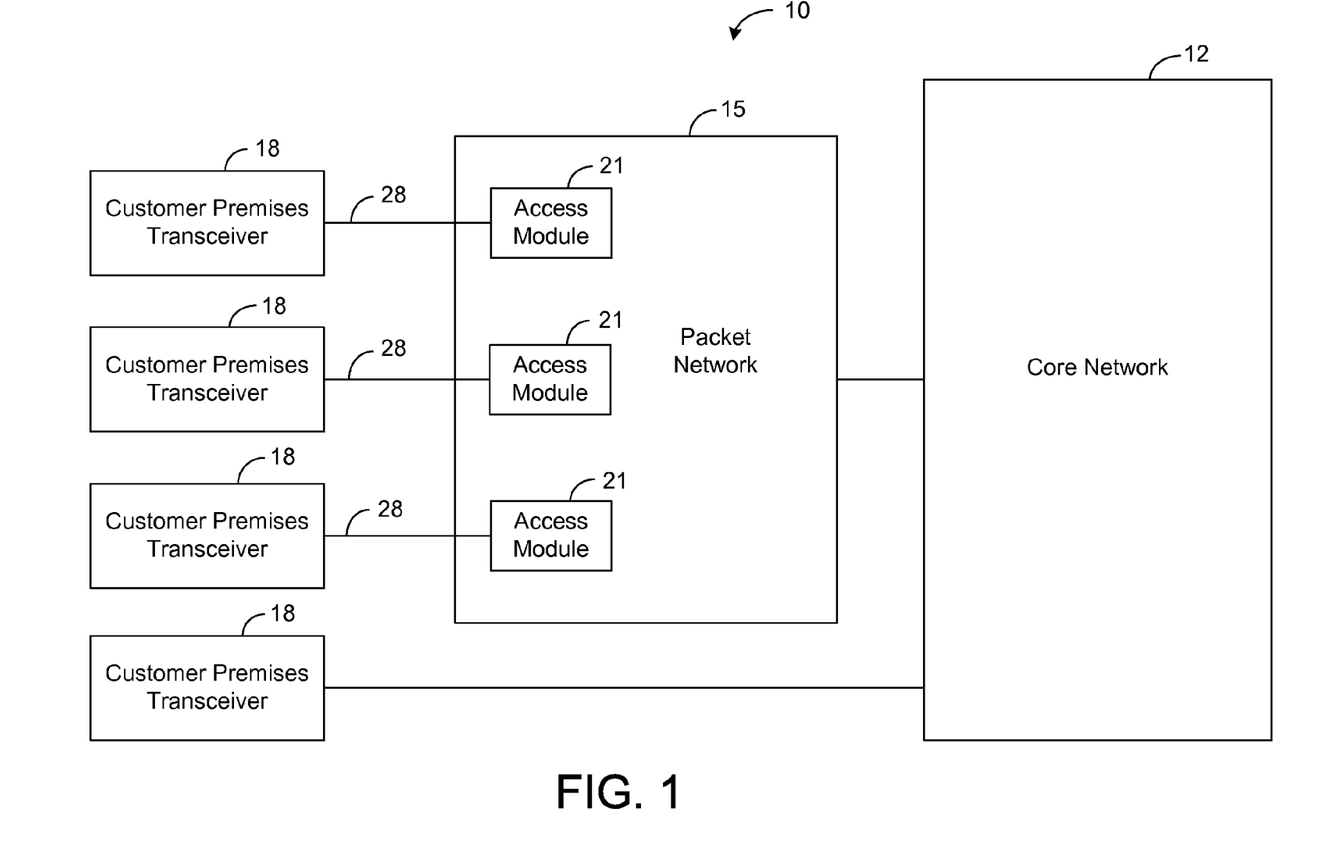
FIG. 1 is a block diagram depicting an exemplary embodiment of a communication system having access modules according to an aspect of the present disclosure.

FIG. 1 depicts an exemplary communication system 10 comprising a core network 12, a packet network 15, a plurality of customer premises (CP) transceivers 18, and a plurality of access modules 21. The core network 12 transmits data signals to the packet network 15. In one exemplary embodiment shown by FIG. 1, the packet network 15 communicates data packets in accordance with Ethernet protocols, but other types of protocols are possible in other embodiments. The access modules 21 are located at a network facility, such as a central office, or other location within the packet network 15, and the access modules 21 are coupled to the CP transceivers 18 via subscriber lines 28. In one exemplary embodiment, each subscriber line comprises at least one twisted-wire pair, but other types of communication media, such as optical fibers may be used in other embodiments.

Note that any access module 21 may be coupled to any number of subscriber lines 28. Further, the subscriber line or lines 28 coupled to a given access module may extend to and service the same customer premises or, alternatively, a plurality of customer premises.

The access modules 21 are configured to process data packets received from the core network 12 and forward the packets to the appropriate CP transceivers 18. Additionally, the access modules 21 are further configured to receive data packets from the CP transceivers 18 and to forward such packets through the packet network 15 to the core network 12.

Figure 2:
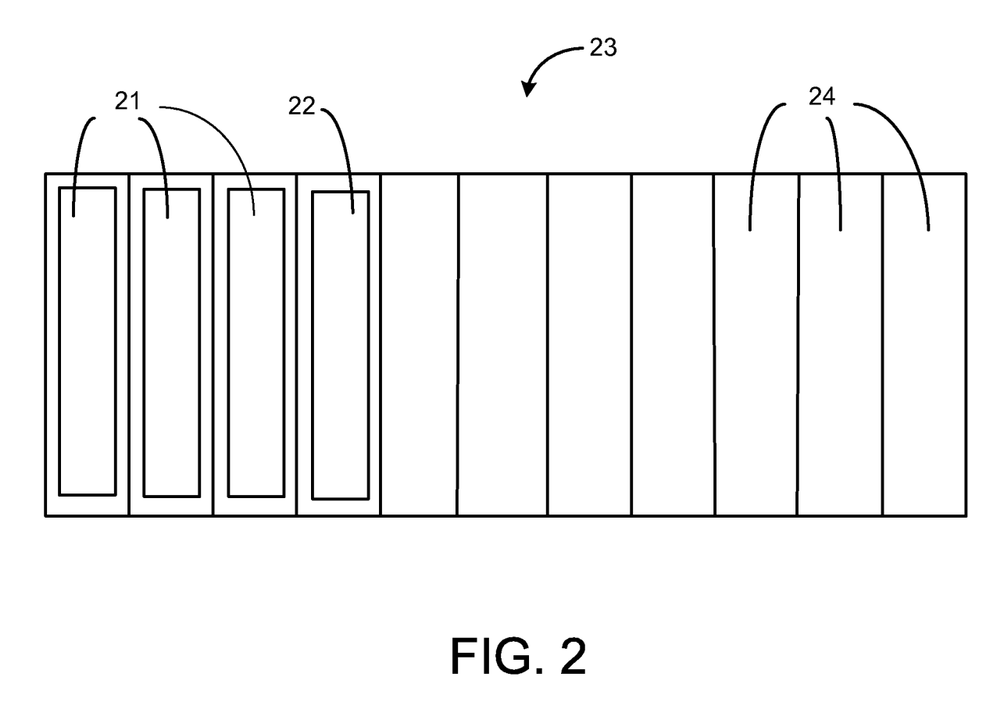
FIG. 2 depicts an exemplary chassis for storing access modules, such as the access modules depicted by FIG. 1.
Figure 3:
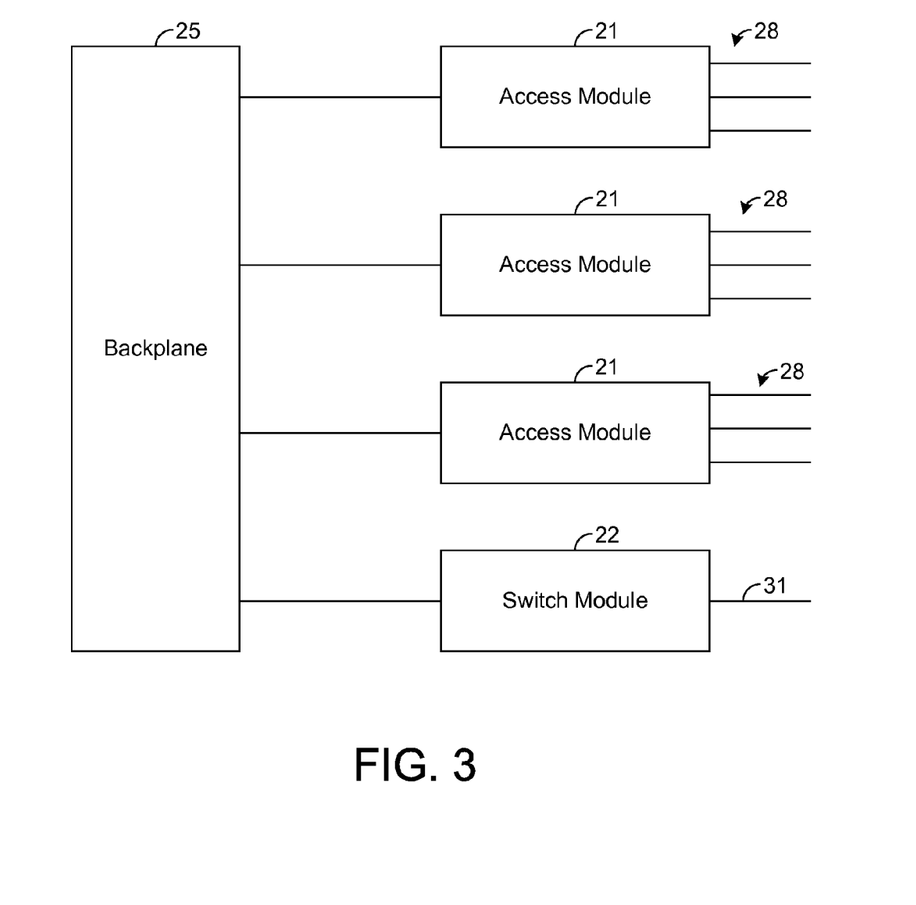
FIG. 3 is a block diagram depicting the access modules of FIG. 1 coupled to an exemplary switch module through a backplane.

FIG. 2 depicts an exemplary chassis 23 at a central office or other location for housing a plurality of access modules 21 and at least one switch module 22. The chassis 23 has a plurality of slots 24 for receiving the plurality of access modules 21 and the switch module 22. As depicted by FIG. 3, the access modules 21 are electrically coupled to the switch module 22 through a backplane 25 of the chassis 23 in order to enable communication between the access modules 21 and the switch module 22. While FIG. 2 and FIG. 3 each depict three access modules 21 and one switch module 22, any number of access modules 21 and switch modules 22 may be used in other embodiments. Each access module 21 is coupled to a plurality of subscriber lines 28 and communicates via the subscriber lines 28 with CP transceivers 18 (FIG. 1) at one or more customer premises. The switch module 22 is coupled to a high-speed network connection 31, such as an optical fiber. In one exemplary embodiment, the network connection 31 is coupled to a node of the packet network 15. Upon receiving a data packet from a subscriber line 28, the access module 21 transfers the packet across the backplane 25 to the switch module 22. The switch module 22 then forwards the packet via the network connection 31 to a node of the packet network 15.

Figure 4:
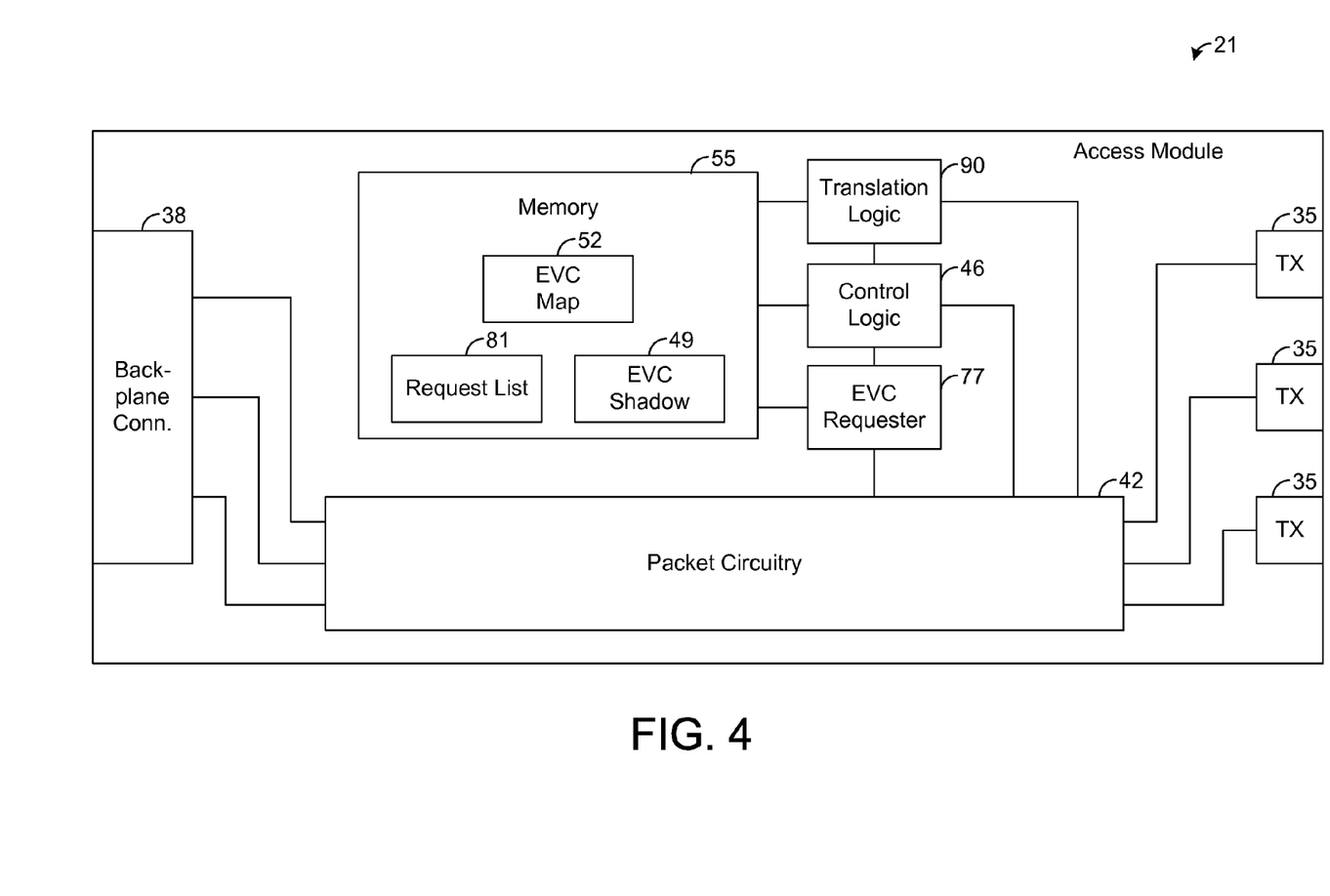
FIG. 4 is a block diagram depicting an exemplary embodiment of an access module, such as is depicted by FIG. 3.

FIG. 4 depicts an exemplary embodiment of an access module 21. The access module 21 has a plurality of transceivers 35 respectively coupled to subscriber lines 28 (FIG. 3), and the access module 21 has a backplane connector 38 detachably coupled to the backplane 25 (FIG. 3) to enable communication with the switch module 22 (FIG. 3). Packets received from the subscriber lines 28 are processed by packet circuitry 42 before being transmitted over the backplane 25 to the switch module 22. The packet circuitry 42 operates under the control of control logic 46, which uses at least one EVC shadow 49 and at least one EVC map 52 in controlling the packet circuitry 42.

In this regard, the control logic 46 uses the EVC map 52 to map packet identifiers to VLAN tags or other EVC identifiers. For illustrative purposes, it will be assumed hereafter, unless otherwise indicated, that the packet identifiers are mapped to S-tags by the EVC map 52, but it should be emphasized that other types of EVC identifiers may be used in other embodiments. There are various techniques that can be used to find the appropriate S-tag for a packet. For example, each packet includes various packet identifiers, such as identifiers identifying the source address and destination address of the packet. The EVC map 52 may map any such identifiers to a specific S-tag. When a packet is received, the control logic 46 determines the S-tag that is mapped to at least one packet identifier in the received packet and inserts this S-tag into the data packet. This S-tag may be used by nodes of the packet network 15 to forward the packet from node-to-node, as is known in the art.

The EVC shadow 49 indicates EVC attributes for a particular EVC carrying the packet and is retrieved from a centralized location, as will be described in more detail hereafter. In one exemplary embodiment, each EVC shadow 49 is a copy of a respective set of EVC attribute data 72 (FIG. 5) stored at the switch module 22 or other central location.

Note that the control logic 46 may be implemented in hardware, software, firmware, or any combination thereof. In one exemplary embodiment, the control logic 46 is implemented in software. When the control logic 46 is implemented in software, the access module 21 has an instruction processing element (not shown), such as a digital signal processor (DSP) or a central processing unit (CPU), for executing instructions of the software.

In one exemplary embodiment, the EVC shadow 49 and the EVC map 52, which are stored in memory 55, are used to ensure that each packet transmitted to the switch module 22 is in accordance with a particular protocol, such as Ethernet, compatible with the packet network 15, and has an appropriate VLAN tag (e.g., S-tag). Some packets received from a subscriber line 28 may already be in a suitable format and, thus, not require modification. However, other packets may be in an unsuitable format and be subject to modification by the packet circuitry 42. For illustrative purposes, it will be assumed hereafter that the packet circuitry 42 is compatible with Ethernet protocol. Thus, if the packet circuitry 42 receives a packet from a subscriber line 28 in accordance with a protocol other than Ethernet, the circuitry 42 is configured to encapsulate the packet into an Ethernet packet and assign the Ethernet packet a VLAN tag (e.g., S-tag). Various overhead of such Ethernet packet may be based on the EVC shadow 49, and the VLAN tag of the Ethernet packet may be assigned by the circuitry 42 based on the EVC map 52. However, if the packet circuitry 42 receives a packet from a subscriber line in accordance with Ethernet protocol, the circuitry may be configured to simply assign the packet a VLAN tag based on the EVC map 52, if the packet does not already include such VLAN tag. Note that an access module 21 may have more than one EVC map 52. For simplicity of illustration, it will be assumed hereafter that each access module 21 has one EVC map 52 unless otherwise indicated.

Figure 5:
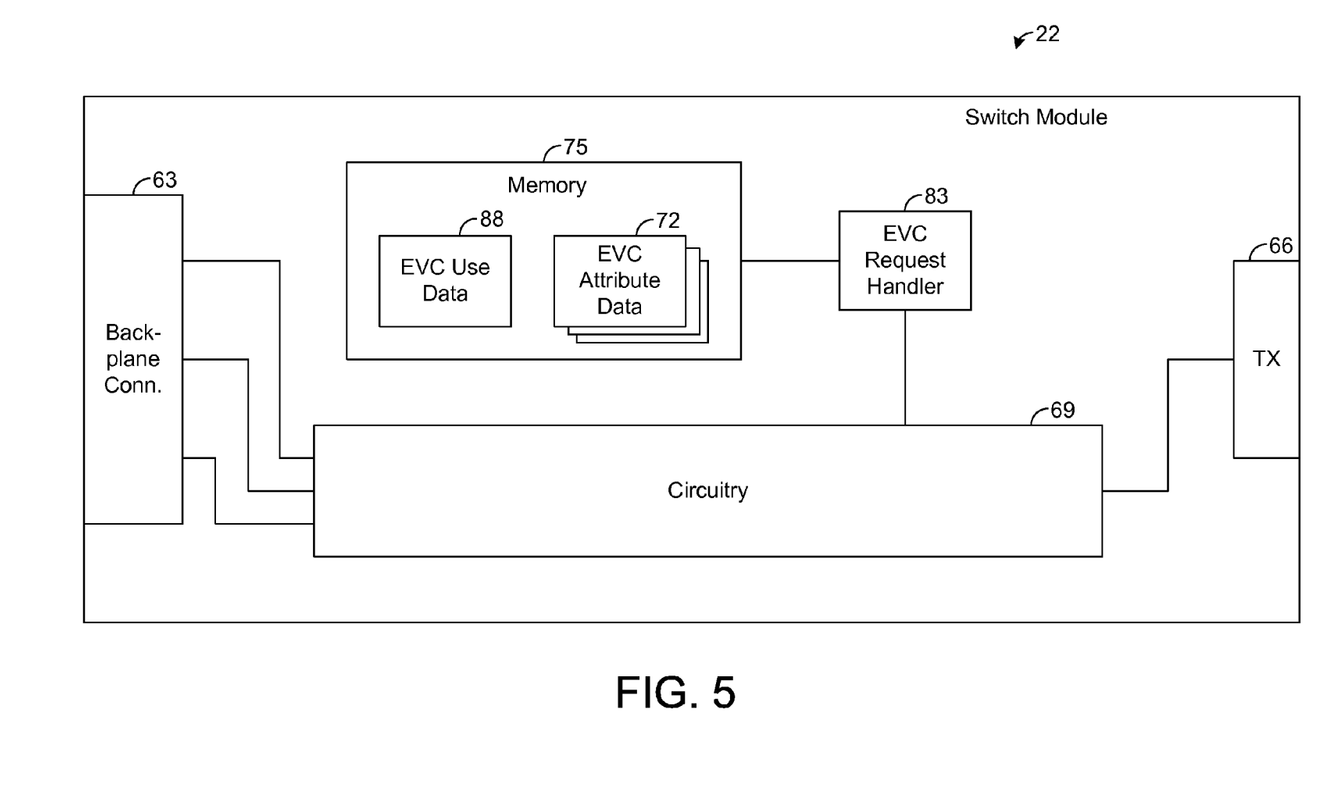
FIG. 5 is a block diagram depicting an exemplary embodiment of a switch module, such as is depicted by FIG. 3.

FIG. 5 depicts an exemplary embodiment of the switch module 22. The switch module 22 comprises a backplane connector 63 detachably coupled to the backplane 25 (FIG. 3), and a transceiver 66 coupled to the network connection 31 (FIG. 3). Further, the switch module 21 has circuitry 69 for processing (e.g., multiplexing or demultiplexing) packets received from the access modules 21 and the network connection 31. For example, the circuitry 69 receives a high-speed data stream containing packets from the packet network 15 via the transceiver 66 and network connection 31, and the circuitry 69 demultiplexes the data stream for transmission across the backplane 25 (FIG. 3) to the access modules 21 such that different packets may be received by different access modules 21. Also, the circuitry 69 receives packets from the access modules 21, and the circuitry 69 multiplexes the packets into a high-speed data stream for transmission through the packet network 15 to the core network 12 (FIG. 1) via the network connection 31. In one exemplary embodiment, the transceiver 66 is optical and modulates an optical signal with the high-speed data stream, but other types of transceivers may be used in other embodiments.

Further, sets of EVC attribute data 72 are stored in memory 75. For example, the memory 75 may comprise a database for storing the EVC attribute data 72. Each set of EVC attribute data 72 is associated with and is indicative of a respective EVC, defining various parameters of that EVC. For example, a set of EVC attribute data 72 associated with a particular EVC may comprise an S-tag of the EVC, information indicating whether the EVC is point-to-point or is point-to-multipoint, and information indicating whether the EVC is currently operational or has an error. Various other types of EVC attributes may be indicated by the associated set of EVC attribute data 72. Copies of sets of the EVC attribute data 72, referred to as "EVC shadows," are transmitted to the access modules 21 so that each access module 21 locally stores the EVC shadows 49 needed by it for processing packets, as will be described in more detail below.

Exemplary techniques for provisioning the system shown by FIGS. 1-4 and for pushing EVC shadows 49 to the appropriate access modules 21 will now be described in more detail below.

Initially, a user provisions the EVC map 52 (FIG. 4) of each access module 21, and the user also provisions the sets of EVC attribute data 72 at a central location, such as the switch module 22. For illustrative purposes, it will be assumed that the EVC attribute data 72 is provisioned and stored at the switch module 22, but the EVC attribute data 72 may be provisioned and/or stored at other locations. As an example, the EVC attribute data 72 may be provisioned and stored on another type of module inserted into a slot 24 of the chassis 23. In other embodiments, the EVC attribute data 72 may be stored at a location remote from the chassis 23 and may be accessed through a network connection, such as the high-speed connection 31, or otherwise.

For each access module 21, the control logic 46 (FIG. 4) determines, based on the module's EVC map or maps 52, which EVCs are to be serviced by the access module 21. As an example, the EVC map 52 may be provisioned to include the S-tag or other identifier of each EVC to be serviced by the access module 21. For each EVC identified in the EVC map 52, the control logic 46 provides the EVC's identifier (e.g., S-tag or EVC name) to an EVC requester 77, which ensures that an EVC shadow 49 associated with the identified EVC is stored in memory 55 local to the access module 21. The EVC requester 77 may be implemented in hardware, software, firmware, or any combination thereof. In one exemplary embodiment, the EVC requester 77 is implemented in software. In such an embodiment, the access module 21 comprises an instruction processing element (not shown), such as a DSP or CPU, for executing instructions of the software.

For each EVC identifier received from the control logic 46, the EVC requester 77 checks the memory 55 to determine if an associated EVC shadow 49 is stored in the memory 55. If not, the EVC requester 77 requests, from the switch module 22 over the backplane 25 or otherwise, the associated EVC shadow 49. In one exemplary embodiment, the EVC requester 77 and the EVC request handler 83 employ a reliable transport protocol for the EVC request and the associated shadow. Indeed, there may be times that communication over the backplane 25 is interrupted or unavailable, and the EVC requester 77 and the EVC request handler 83 operate to ensure that, despite these interruptions, the desired EVC shadows are successfully requested, communicated, and loaded into the access module 21.

In one exemplary embodiment, the EVC requester 77 maintains a request list 81 (FIG. 4) for managing the requests for EVC shadows 49 and ensures that each requested EVC shadow 49 is ultimately loaded into the access module 21 and stored in the module's local memory 55. In this regard, when the EVC requester 77 determines that an EVC shadow 49 for an EVC identified in the EVC map 52 is not stored in the memory 55, the EVC requester 77 adds an entry for the identified EVC to the request list 81. The entry has an identifier (e.g., S-tag or EVC name) identifying the pertinent EVC.

Periodically (e.g., every 20 seconds) or otherwise from time-to-time, the EVC requester 77 traverses the request list 81 and, for each entry in the request list 81, defines a request, referred to hereafter as an "EVC request," that requests retrieval of an EVC shadow 49 for the EVC identified by the entry. In this regard, each set of EVC attribute data 72 is associated with and includes the EVC identifier of a respective EVC to which the set pertains. Each EVC request includes the identifier of the EVC for which attributes are requested. As will be described in more detail hereafter, the EVC request handler 83 (FIG. 5) uses the EVC identifier in the request to locate the set of attribute data 72 associated with the EVC identified by such identifier and returns a shadow of such set of attribute data 72. That is, a shadow of the set of attribute data 72 identified by the request is returned to the access module 21 that transmitted the request.

In one exemplary embodiment, the EVC request is an Ethernet packet or a packet in accordance with the protocol used for data packets carrying data from the subscriber lines 28, but other types of EVC requests are possible in other embodiments. The EVC requester 77 includes, in the EVC request, the information from the request list entry (e.g., the EVC identifier identifying the EVC associated with the shadow 49 being requested) and the identifier of the access module 21 from which the EVC request is transmitted. As an example, the EVC requester 77 may encapsulate the information from the request list entry as payload data within an Ethernet packet. In one exemplary embodiment, the payload data also includes an identifier identifying the access module 21 relative to other modules in the chassis 23. As will be described in more detail hereafter, such an identifier is used by the EVC request handler 83 to handle the EVC request. In another embodiment, the EVC identifier is encapsulated as payload data in the EVC request, and the identifier of the transmitting access module 21 is inserted into the packet's header as the packet's source address. Other techniques for forming the EVC request are possible in other yet other embodiments.

After forming an EVC request, the EVC requester 77 transmits such request via the backplane 25 (FIG. 3) to the switch module 22. Thus, from time-to-time, the EVC requester 77 transmits an EVC request for each entry in the request list 81. If communication with the switch module 22 is temporarily interrupted, the EVC requester 77 continues to transmit from time-to-time the EVC requests for each entry in the request list 81 such that all of the EVC requests are received by the switch module 22 once communication with the switch module 22 resumes.

The EVC request handler 83 (FIG. 5) at the switch module 22 is configured to receive and handle the EVC requests transmitted from the access modules 21. The EVC request handler 83 may be implemented in hardware, software, firmware, or any combination thereof. In one exemplary embodiment, the EVC request handler 83 is implemented in software. In such and embodiment, the switch module 22 comprises an instruction processing element (not shown), such as a DSP or CPU, for executing instructions of the software.

As shown by FIG. 5, the EVC request handler 83 maintains EVC use data 88 indicating, for each set of the EVC attribute data 72, to which of the access modules 21 a shadow has been transmitted. Accordingly, the use data 88 can be analyzed to determine which of the access modules 21 should receive an update to a particular set of attribute data 72, as will be described in more detail hereafter.

When the EVC request handler 83 receives an EVC request from one of the access modules 21, referred to hereafter as the "requesting access module 21," the EVC request handler 83 determines whether to accept or deny the EVC request. For example, if the EVC use data 88 indicates that a shadow of the same set of attribute data 72 identified in the request has recently been transmitted to the requesting access module 21, the EVC request handler 83 may deny the request. Such a scenario may occur when the EVC request is transmitted from the requesting access module 21 after the EVC request handler 83 has transmitted a shadow of the identified set of attribute data 72 based on a previous request but before such module 21 has received the shadow. Denying the request prevents a duplicate shadow from being needlessly transmitted to the requesting access module 21.

If the EVC request is denied, the EVC request handler 83 discards the EVC request without transmitting to the requesting access module 21 a shadow of the set of EVC attribute data 72 identified in the request, and the EVC request handler 83 transmits a message indicative of the denial to the requesting access module 21. Note that the denial may be based on other reasons. For example, each set of EVC attribute data 72 may identify each access module 21 to which the set is to be provided. If the requesting access module 21 is not identified by the requested set of attribute data 72, the EVC request handler 83 may deny the EVC request. The EVC request may be denied for yet other reasons in other embodiments.

If the EVC request handler 83 accepts the EVC request, the EVC request handler 83 updates the EVC use data 88 to indicate that a shadow of the set of EVC attribute data 72 identified by the EVC identifier in the request has been transmitted to the access module 21 that transmitted the request. The EVC request handler 83 also creates an EVC shadow 49 by making a copy of such set of EVC attribute data 72 and transmits the EVC shadow 49 to the requesting access module 21. In one exemplary embodiment, the EVC request handler 83 encapsulates the EVC shadow 49 in one or more Ethernet packets for transmission across the backplane 25 to the requesting access module 21 that originally transmitted the EVC request.

When the requesting access module 21 receives the foregoing Ethernet packets, the EVC requester 77 de-encapsulates the Ethernet packet or packets to recover the EVC shadow 49 and stores the EVC shadow 49 in a read-only portion of the module's memory 55, although the EVC shadow 49 may be stored in other types of types of memory in other embodiments. Once the requested EVC shadow 49 is stored in the memory 55, the entry containing the EVC identifier of the EVC associated with the received shadow 49 is removed (e.g., deleted) from the request list 81. Accordingly, the sets of EVC attribute data 72 are provisioned at a centralized location and shadows of such attribute data 72 are automatically distributed to the access modules 21, when requested by such modules 21. This allows a scalable architecture that does not require each access module 21 to be aware of the attributes for each EVC in the system and does not require the switch module 22 to know detailed information about each EVC map 52 in the system.

Note that, if desired, access modules 21 that were previously provisioned under a different model may be migrated to the centralized provisioning model described above. In this regard, translation logic 90 (FIG. 4) may be downloaded to an existing access module 21. The translation logic 90 may be configured to define an EVC map 52 and to determine which EVCs are pertinent for the access module 21 based on the provisioning information in the module 21. The EVC shadows 49 of the pertinent EVCs may then be loaded into the access module 21 according the exemplary techniques described herein. Note that the translation logic 90 may be implemented in hardware, software, firmware, or any combination thereof. In one exemplary embodiment, the translation logic 90 is implemented in software. When the translation logic 90 is implemented in software, the access module 21 has an instruction processing element (not shown), such as a digital signal processor (DSP) or a central processing unit (CPU) for executing instructions of the software.

In addition, if a set of EVC attribute data 72 is updated or otherwise modified, the EVC request handler 83 consults the EVC use data 88 to identify each access module 21 to which an EVC shadow 49 of the updated set of EVC attribute data 72 was previously transmitted. As an example, assume that the EVC request handler 83 has previously transmitted an EVC shadow 49 of a particular set of attribute data 72, referred to as the "original set of attribute data 72," to a plurality of access modules 21, referred to hereafter as the "affected modules 21." Thus, the EVC use data 88 has been previously updated, as described above, to indicate that the original set of attribute data 72 was previously transmitted to each of the affected modules 21. Further assume that the original set of attribute data 72 is updated with a set of attribute data referred to hereafter as the "new set of attribute data 72." This updated set of attribute data 72 shall be referred to hereafter as the "new set of attribute data 72." For example, the original set of attribute data 72 may be replaced with the new set of attribute data 72, or a portion of the original set of attribute data 72 may be changed thereby defining the new set of attribute data 72.

The EVC request handler 83 analyzes the EVC use data 88 and identifies each of the affected modules 21 to which a shadow of the original set of attribute data 72 was previously transmitted. For each such module 21, the EVC request handler 83 transmits an EVC shadow 49 of the new set of attribute data 72. This received shadow 49 identifies the same EVC as the shadow 49 derived from the original set of attribute data 72 stored at the switch module 21. In such case, the control logic 46 of the affected module 21 replaces the shadow 49 derived from the original set of attribute data 72 with new shadow 49 just received. Thus, the update to the original set of attribute data 72 is automatically pushed to each affected module 21.

In one exemplary embodiment, assume that an access module 21 and a switch module 22 are located in a chassis 23 at a central office, and that the access module 21 can communicate with the switch module 22 through the backplane 25. Also assume that the access module 21 is provisioned with a respective EVC map 52 and that the switch module 22 is provisioned with the EVC attribute data 72. Further assume that the access module 21 is configured to ensure that each packet transmitted to the switch module 22 is in accordance with Ethernet protocol.

Figure 6:
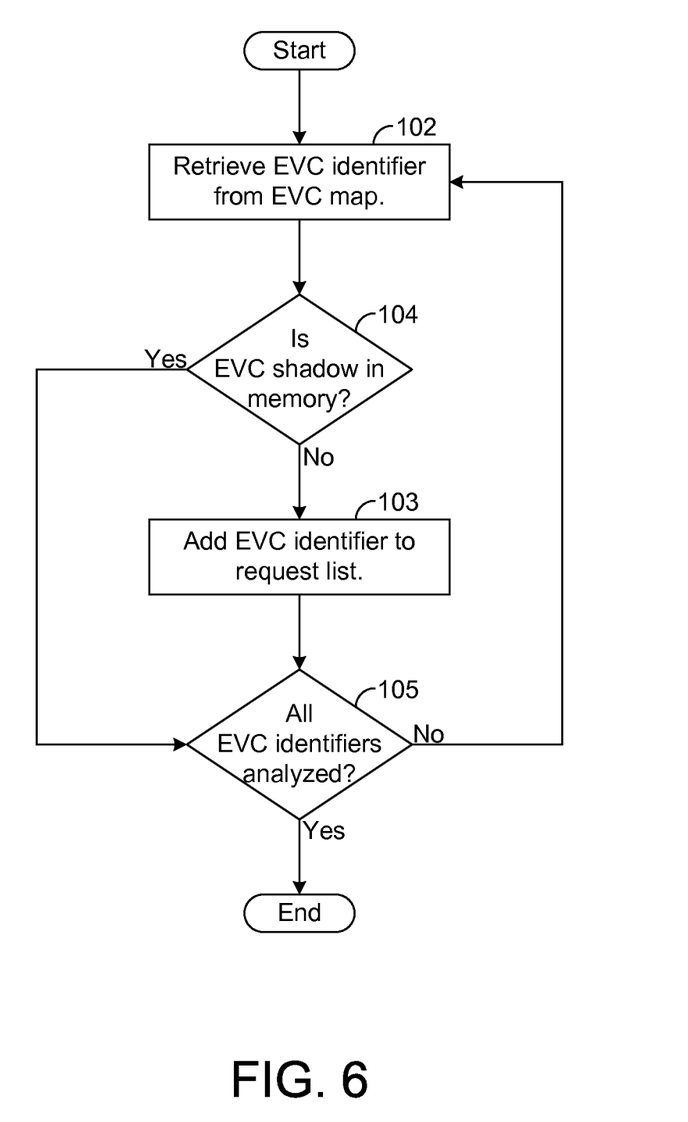
FIG. 6 is a flowchart illustrating an exemplary architecture and functionality of control logic, such as is depicted by FIG. 4.

Upon power up, the control logic 46 of such access module 21 accesses the EVC map 52 and retrieves an EVC identifier, as shown by block 102. The control logic 46 checks the memory 55 and determines whether an EVC shadow 49 for the identified EVC is stored in the memory 55, as shown by block 104. If an associated EVC shadow 49 is stored in the memory 55, the control logic 46 then proceeds to block 105. If not, the control logic 46 returns to block 102 to retrieve and analyze the next EVC identifier in the EVC map 52.

If the control logic 46 determines in block 104 that an EVC shadow 49 for the retrieved EVC identifier is not stored in the memory 55, then the control logic 46 adds the EVC identifier to the request list 81, as shown by block 103. As shown by block 105, the control logic 46 determines whether all of the EVC identifiers in the EVC map 52 have been retrieved and analyzed via blocks 102 and 104. If not, the control logic 46 returns to block 102. Thus, the request list 81 is eventually updated to include the EVC identifier of each EVC identified by the map 52 for which an associated EVC shadow 49 is not stored in the local memory 55. Note that the control logic 46 may perform the method shown by FIG. 6 for each EVC map 52 in the access module 21.

For illustrative purposes, assume that a particular EVC, referred to as "EVC A," is identified by the EVC map 52 but does not have an associated EVC shadow 49 in the memory 55 such that the identifier of EVC A is added to the request list 81. As shown by block 106 of FIG. 7, the EVC requester 77 from time-to-time transmits an EVC request for each EVC identifier in the request list 81. Thus, at some point, the EVC requester 77 transmits an EVC request for EVC A.

Figure 7:
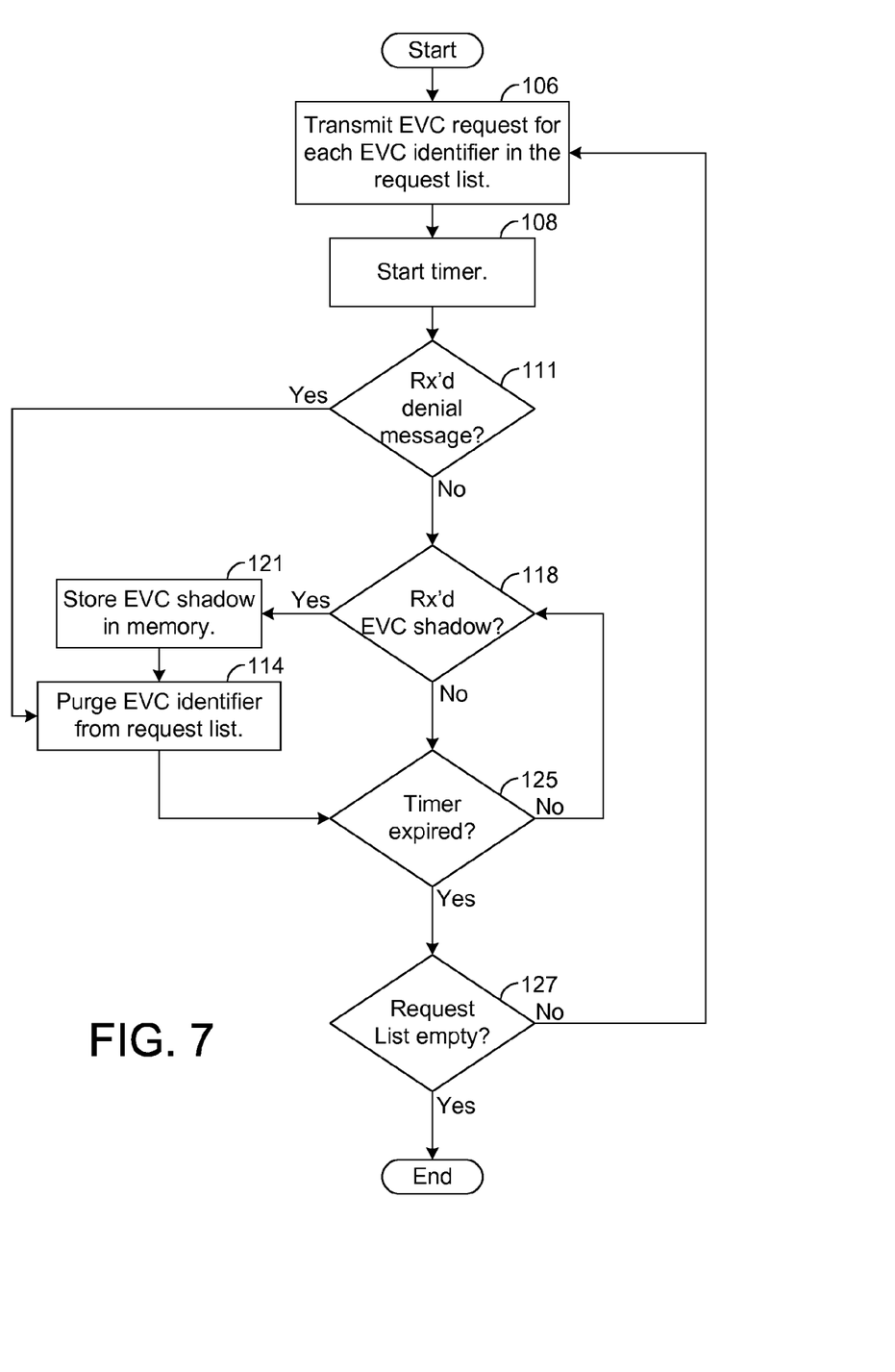
FIG. 7 is a flowchart illustrating an exemplary architecture and functionality of an EVC requester, such as is depicted by FIG. 4.

In one exemplary embodiment, the EVC requester 77 transmits such an EVC request by encapsulating the identifier of EVC A as payload data of an Ethernet data packet. The header of such packet is controlled to indicate that the data packet is an EVC request and to include a destination address that causes the packet to be forwarded through the backplane 25 to the switch module 22. The header also has an address, referred to as a "source address," identifying the access module 21 that transmitted the EVC request. After transmitting an EVC request for each identifier, the EVC requester 77 initiates a timer that expires after a predefined amount of time has expired, such as 20 seconds, as shown by block 108. Depending on run-time conditions, some, all, or none of the EVC requests transmitted in block 106 may arrive at the switch module 22 and be received by the EVC request handler 83.

When the EVC request handler 83 does receive an EVC request, the EVC request handler 83 determines whether to accept or deny the EVC request. If the EVC request handler 83 decides to deny request, then the EVC request handler 83 discards the request and, based on the request's source address, transmits a message indicative of the denial to the access module 21 that transmitted the EVC request. Such message shall be referred to hereafter as a "denial message." In one exemplary embodiment, the denial message is transmitted as an Ethernet data packet, and the EVC identifier from the request being denied is encapsulated as payload data within the packet. The header of such packet is controlled to indicate that the data packet is a denial message and to include a destination address that causes the packet to be forwarded through the backplane 25 to the access module 21 identified by the EVC request that is denied.

Upon receiving the denial message, the EVC requester 77 of the access module 21 that originally transmitted the denied EVC request removes an EVC identifier from the request list 81, as shown by blocks 111 and 114. In particular, the EVC requester 77 removes the EVC identifier that is encapsulated in the denial message. Thus, the EVC requester 77 does not keep trying to transmit an EVC request for an EVC identifier that has already been transmitted in an EVC request that was denied.

If the EVC request received by the switch module 22 is instead accepted by the EVC request handler 83, the EVC request handler 83 updates the EVC use data 88 to indicate that the set of EVC attribute data 72 identified by the requested EVC (i.e., the set of attribute data 72 having the same EVC identifier as the request) has been transmitted to the access module 21 identified by the source address in the accepted EVC request. The EVC request handler 83 also creates an EVC shadow 49 of such set of EVC attribute data 72 and transmits the EVC shadow 49 to the access module 21 identified by the source address of the accepted EVC request. The EVC request handler 83 encapsulates the EVC shadow 49 in at least one Ethernet packet and transmits the packet or packets across the backplane 25 to the access module 21 that originally transmitted the accepted EVC request. Thus, if the EVC request handler 83 receives and accepts the EVC request that identifies EVC A, then the EVC request handler 83 transmits a copy of the EVC attribute data for EVC A to the access module 21 that requested it.

When the access module 21 receives an EVC shadow 49 from the switch module 22, the EVC requester 77 stores the EVC shadow 49 in the memory 55, as shown by blocks 118 and 121. In this regard, each EVC shadow 49 includes the EVC identifier identifying the EVC to which the shadow 49 pertains. The EVC requester 77 searches the memory 55 for an EVC shadow 49 having the EVC identifier matching that of the received EVC shadow 49. If such a shadow 49 is found already in the memory 55, the EVC requester 77 overwrites such shadow 49 with the newly-received shadow 49. If a shadow 49 having a matching EVC identifier is not found in the memory 55, then the EVC requester 77 stores the newly-received shadow 49 in the memory 55 without overwriting any EVC shadow 49 that may already be stored in the memory 55.

After storing the newly-received EVC shadow 49 in the memory 55, the EVC requester 77 purges the EVC identifier associated with such EVC shadow 49 from the request list 81, as shown by block 114, thereby preventing the EVC requester 77 from later submitting an EVC request for the same EVC identifier. Thus, if an EVC shadow 49 associated with EVC A is received by the access module, the EVC requester 77 stores the shadow 49 in memory 55 and removes the identifier of EVC A from the request list 81. Eventually, an EVC shadow 49 is received or an EVC request is denied for any given EVC identifier added to the request list 81. Thus, use of the request list 81 ensures that an EVC shadow 49 is not missing in the memory 55 due to a communication failure between the access module 21 and the switch module 22.

Note that purging of EVC identifiers from the request list 81 is unnecessary. As an example, in one embodiment, rather than purging EVC identifiers from the request list 81, the EVC requester 77 correlates each EVC identifier with a status indicator (e.g., a bit or a bit string) indicating whether an EVC shadow 49 for the EVC identifier is stored in memory 55. That is, the status indicator indicates whether an EVC request associated with the EVC identifier has been satisfied. When a new EVC shadow 49 is received and stored in memory 55, rather than purging the shadow's EVC identifier from the request list 81 as described above, the EVC requester 77 updates the status indicator for such EVC identifier in the request list 81 to indicate that its request has been satisfied. Thus, the request list 81 stores a list of all EVC identifiers for which an EVC request is sent. The EVC requester 77 from time-to-time analyzes the list 81 and transmits an EVC request for each EVC identifier correlated with a status indicator indicating that an EVC request for the identifier has yet to be been satisfied. Thus, the operation for such an embodiment is similar to that described above when the request list 81 is purged except the EVC identifiers of satisfied requests remain in the request list 81. In both embodiments, the request list 81 is updated in response to a newly received EVC shadow 49 to prevent the EVC requester 77 from sending further EVC requests for the EVC identifier associated with the newly received shadow.

After implementation of block 108, the timer eventually expires. When this occurs, the EVC requester 77 determines whether the request list 81 is empty, as shown by blocks 125 and 127. If not, the EVC requester 77 returns to block 106 to transmit an EVC request for each EVC identifier still in the request list 81. Thus, an EVC request is repetitively sent for each EVC identifier in the request list 81 until an EVC shadow 49 for the EVC identifier is stored in the memory 55 or until an EVC request for the EVC identifier is denied.

Now, therefore, the following is claimed:

1. A communication system, comprising:
    a plurality of access modules, each of the access modules coupled to at least one respective subscriber line and inserted into a respective slot of a chassis, the access modules configured to transmit virtual circuit requests identifying particular virtual circuits of a packet network;
    memory for storing sets of virtual circuit (VC) attribute data for use in provisioning the access modules to service packets carried by the virtual circuits, the memory external to each of the access modules;

a request handler configured to receive the virtual circuit requests from the access modules and to distribute shadows of the sets of VC attribute data to the access modules based on the virtual circuit requests, wherein one of the access modules is configured to transmit to the request handler one of the virtual circuit requests, wherein the request handler is configured to transmit one of the shadows to the one access module in response to the one virtual circuit request, wherein the one shadow has VC attribute data indicative of one of the virtual circuits identified by the one virtual circuit request, wherein the one access module has logic configured to provision the one access module to service packets carried by the one virtual circuit based on the one shadow, and wherein the one access module is configured to receive a first data packet in accordance with a first protocol and to encapsulate data from the first data packet into a second data packet in accordance with a second protocol based on the one shadow.

2. The system of claim 1, wherein each of the virtual circuits is an Ethernet virtual circuit (EVC).

3. The system of claim 1, wherein the request handler is further configured to determine whether to accept each of the requests based on VC use data, the VC use data indicating, for each of the sets of attribute data, each access module to which a shadow has been transmitted.

4. The system of claim 1, wherein the request handler, in response to receiving the one virtual circuit request, is configured to transmit, to the one access module the one shadow.

5. The system of claim 1, wherein the request handler, in response to the one virtual circuit request, is configured to update VC use data to indicate that the one shadow has been transmitted to the one access module.

6. The system of claim 1, wherein the one access module is configured to store a request list having virtual circuit identifiers, wherein the one access module, in response to the one shadow, is configured to update the request list, and wherein the one access module is configured to transmit a plurality of the virtual circuit requests based on the request list.

7. The system of claim 6, wherein the one access module is configured to purge, from the request list, one of the virtual circuit identifiers identifying the one virtual circuit in response to the one shadow.

8. The system of claim 1, wherein the one access module is configured to store mapping data for mapping packet identifiers to virtual circuit identifiers, the one access module configured to transmit to the request handler the one virtual circuit request based on the mapping data.

9. The system of claim 8, wherein the one access module is configured to store a request list indicative of virtual circuit requests that are pending for the one access module, and wherein the one access module is configured to ensure, based on the request list, that the one access module receives a respective shadow from the request handler for each of the pending virtual circuit requests.

10. A communication system, comprising:
a chassis having a plurality of slots and a backplane;
a first module inserted into one of the slots and coupled to the backplane, the first module having memory for storing sets of virtual circuit (VC) attribute data; and
a second module inserted into one of the slots and coupled to the backplane, the second module having memory for storing a virtual circuit map having identifiers identifying virtual circuits of a network to be serviced by the second module, the second module having logic configured to transmit, based on the virtual circuit map, a request identifying one of the virtual circuits to the first module via the backplane, wherein the first module is configured to transmit, to the second module via the backplane, a shadow of one of the sets of VC attribute data in response to the request, the one set of VC attribute data associated with the virtual circuit identified by the request, wherein the second module has logic configured to provision the second module to handle data packets carried by the virtual circuit identified by the request based on the shadow, and wherein the second module is configured to receive a first data packet in accordance with a first protocol and to encapsulate data from the first data packet into a second data packet in accordance with a second protocol based on the shadow.

11. The system of claim 10, wherein each of the virtual circuits is an Ethernet virtual circuit (EVC).

12. The system of claim 10, wherein the first module is configured to store VC use data indicating, for each of the sets of VC attribute data, each access module to which a shadow is transmitted, and wherein the first module is configured to update the VC use data in response to the request to indicate that a shadow of the one set of VC attribute data has been transmitted to the second module.

13. The system of claim 12, wherein the first module is configured to transmit, to the second module via the backplane, a new set of VC attribute data in response to a determination by the first module, based on the VC use data, that the shadow of the one set of attribute data has been transmitted to the second module.

14. The system of claim 10, wherein the logic is configured to store in a request list an identifier identifying the virtual circuit identified by the request, the logic configured to update the request list in response to the shadow, wherein the logic is configured to transmit the request based on the request list.

15. The system of claim 14, wherein the logic is configured to purge, from the request list in response to the shadow, the identifier identifying the virtual circuit identified by the request.

16. A method for centrally provisioning virtual circuit information, the method comprising the steps of:
inserting a plurality of access modules into slots of a chassis;
coupling each of the access modules to at least one respective subscriber line;
storing sets of virtual circuit (VC) attribute data in memory external to each of the access modules;
transmitting from the access modules requests identifying particular virtual circuits of a network;
distributing shadows of the sets of VC attribute data to the access modules based upon the requests;
automatically provisioning the access modules to service packets carried by the virtual circuits based on the shadows;
receiving at one of the access modules a first data packet in accordance with a first protocol;
encapsulating, by the one access module, data from the first data packet into a second data packet in accordance with a second protocol based on one of the shadows received at the one access module; and
transmitting the second data packet from the one access module.

17. The method of claim 16, wherein each of the virtual circuits is an Ethernet virtual circuit (EVC).

18. The method of claim 16, further comprising the step of determining whether to accept each of the requests based on VC use data, the VC use data indicating, for each of the sets of VC attribute data, to which of the access modules a shadow of the respective set of VC attribute data is transmitted.

19. The method of claim 18, further comprising the step of updating the VC use data to indicate that one of the shadows has been transmitted.

20. The method of claim 19, further comprising the steps of:
    storing a request list having identifiers of the virtual circuit, wherein the transmitting step is based on the request list; and
    updating the request list based on the one shadow.

21. The method of claim 20, wherein the updating step comprises the step of purging, from the request list, one of the identifiers identifying a virtual circuit associated with the one shadow.

22. The method of claim 16, wherein the transmitting step comprises the step of transmitting the requests from the access modules across a backplane of the chassis.

23. The method of claim 16, further comprising the step of storing in memory of one of the access modules mapping data for mapping packet identifiers to virtual circuit identifiers, wherein the transmitting step is based on the mapping data.

24. The method of claim 23, further comprising the steps of:
    storing in the memory of the one access module a request list indicative of virtual circuit requests that are pending for the one access module; and
    ensuring, based on the request list, that the one access module receives a respective shadow for each of the pending virtual circuit requests.

25. The method of claim 24, further comprising the step of manually provisioning the mapping data in the one access module.

* * * * *